(12) United States Patent
Iyer et al.

(10) Patent No.: US 12,547,621 B2
(45) Date of Patent: Feb. 10, 2026

(54) SOURCE MONITORING FOR DISCRETE WORKLOAD PROCESSING

(71) Applicant: Snowflake Inc., Bozeman, MT (US)

(72) Inventors: Ganeshan Ramachandran Iyer, Redmond, WA (US); Raghav Ramachandran, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/670,299

(22) Filed: May 21, 2024

(65) Prior Publication Data

US 2025/0363108 A1 Nov. 27, 2025

(51) Int. Cl.
*G06F 16/2453* (2019.01)
*G06F 16/23* (2019.01)
*G06F 16/25* (2019.01)

(52) U.S. Cl.
CPC .... *G06F 16/24542* (2019.01); *G06F 16/2358* (2019.01); *G06F 16/256* (2019.01)

(58) Field of Classification Search
CPC ........... G06F 16/24542; G06F 16/2358; G06F 16/256
See application file for complete search history.

(56) References Cited

U.S. PATENT DOCUMENTS

| | | | |
|---|---|---|---|
| 2019/0012349 A1* | 1/2019 | Peloski | G06F 16/24556 |
| 2023/0040834 A1* | 2/2023 | Haile | G06F 16/26 |
| 2024/0045669 A1* | 2/2024 | D'Souza | G06F 8/71 |
| 2024/0330268 A1* | 10/2024 | Frankenfield | G06F 16/2365 |
| 2024/0346087 A1* | 10/2024 | Quigley | H04L 9/0894 |

* cited by examiner

*Primary Examiner* — Dangelino N Gortayo
(74) *Attorney, Agent, or Firm* — Schwegman Lundberg & Woessner, P.A.

(57) ABSTRACT

Provided herein are systems and methods for source monitoring associated with discrete workload processing. An example method includes generating a processing pipeline definition comprising a plurality of configurations associated with a corresponding plurality of notification fetching jobs. A source monitor definition is generated based on the processing pipeline definition. A source monitor definition instance is instantiated based on the source monitor definition. One or more notifications associated with a data source are fetched based on executing at least one notification fetching job of the plurality of notification fetching jobs configured in the source monitor definition instance.

30 Claims, 13 Drawing Sheets

400

1200 ⟶

```
┌─────────────────────────────────────────────────────────────┐
│ GENERATE A PROCESSING PIPELINE DEFINITION COMPRISING A      │─ 1202
│ PLURALITY OF CONFIGURATIONS ASSOCIATED WITH A CORRESPONDING │
│ PLURALITY OF NOTIFICATION FETCHING JOBS                     │
└─────────────────────────────────────────────────────────────┘
                              ↓
┌─────────────────────────────────────────────────────────────┐
│ GENERATE A SOURCE MONITOR DEFINITION BASED ON THE PROCESSING│─ 1204
│ PIPELINE DEFINITION                                          │
└─────────────────────────────────────────────────────────────┘
                              ↓
┌─────────────────────────────────────────────────────────────┐
│ INSTANTIATE A SOURCE MONITOR DEFINITION INSTANCE BASED ON THE│─ 1206
│ SOURCE MONITOR DEFINITION                                    │
└─────────────────────────────────────────────────────────────┘
                              ↓
┌─────────────────────────────────────────────────────────────┐
│ FETCH ONE OR MORE NOTIFICATIONS ASSOCIATED WITH A DATA SOURCE│─ 1208
│ BASED ON EXECUTING AT LEAST ONE NOTIFICATION FETCHING JOB OF │
│ THE PLURALITY OF NOTIFICATION FETCHING JOBS CONFIGURED IN THE│
│ SOURCE MONITOR DEFINITION INSTANCE                           │
└─────────────────────────────────────────────────────────────┘
```

*FIG. 12*

SOURCE MONITORING FOR DISCRETE WORKLOAD PROCESSING

TECHNICAL FIELD

Embodiments of the disclosure generally relate to file processing in data platforms and, more specifically, to techniques for configuring discrete workload processing, such as source monitoring for discrete workload processing using a continuous file processing service (e.g., a processing pipeline).

BACKGROUND

Databases are widely used for data storage and access in computing applications. A goal of database storage is to provide enormous sums of information in an organized manner so that it can be accessed, managed, updated, and shared. Data may be organized into rows, columns, and tables in a database. Different database storage systems may be used to store different types of content, such as bibliographic, full text, numeric, and image content. Further, in computing, different database systems may be classified according to the organizational approach of the database. There are many different types of databases, including relational, distributed, cloud, object-oriented, and others.

Databases may include one or more tables that include or reference data that can be joined, read, modified, or deleted using queries. Databases can store small or large sets of data within one or more tables. This data can be accessed by various users in an organization or even be used to service public users, such as via a website or an application programming interface (API). Both computing and storage resources and their underlying architecture can play a significant role in achieving desirable database performance, including facilitating access to different types of data. However, data processing, including the processing of files, can be associated with inefficient workload distribution, high latency, and inefficient allocation of compute resources.

BRIEF DESCRIPTION OF THE DRAWINGS

The present disclosure will be understood more fully from the detailed description given below and from the accompanying drawings of various embodiments of the disclosure.

FIG. 12 is a flow diagram illustrating the operations of a database system in performing a method for configuring a source monitor, in accordance with some embodiments of the present disclosure.

DETAILED DESCRIPTION

Figure 1:
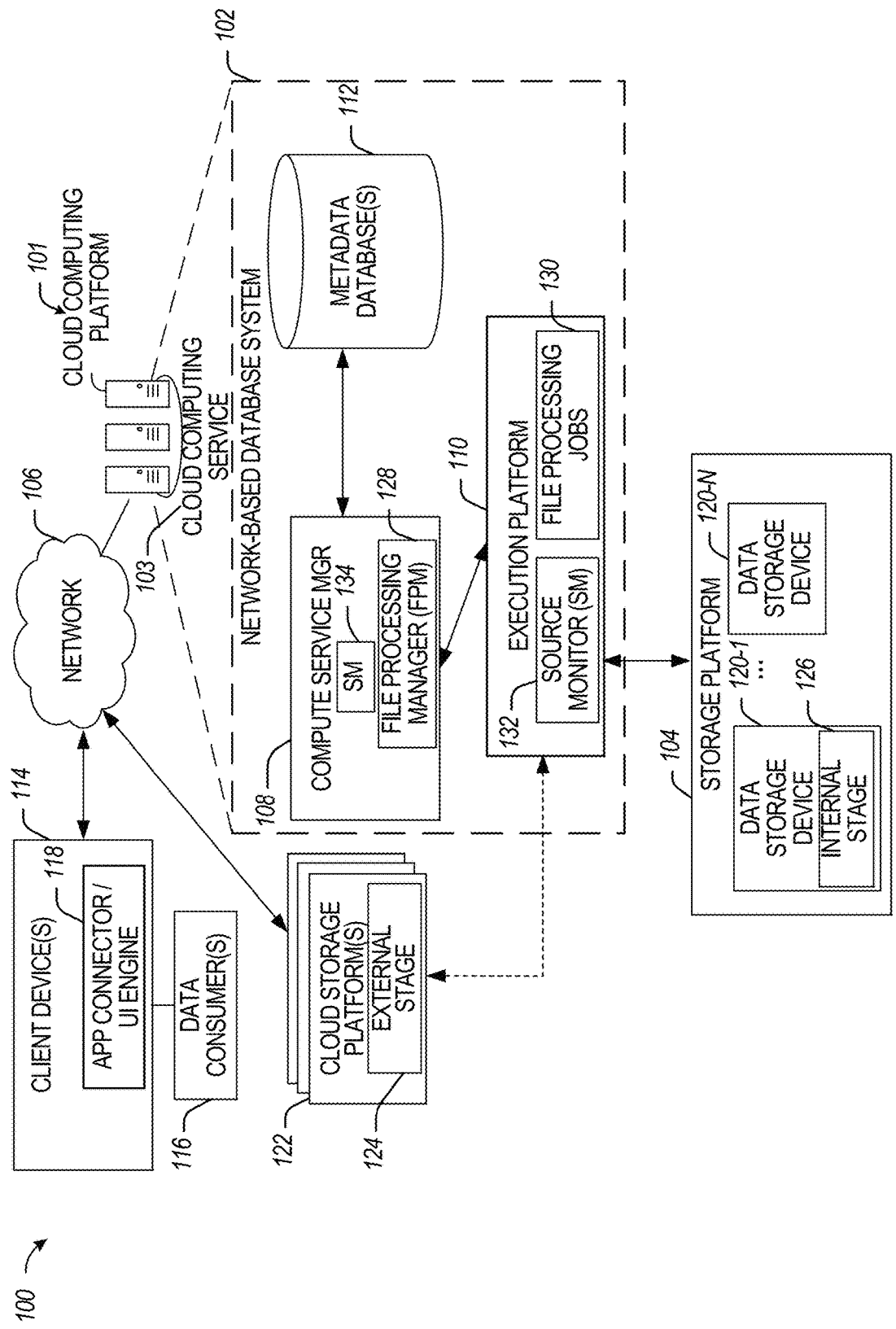
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and the like. If stored internally in the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semi-conductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As used herein, the term "processing pipe" (or "pipe") indicates a functionality to support continuous processing of an abstract discrete item (e.g., an offset in a KAFKA topic, a step in a multi-step workflow, or any other unit of work that can be processed independently and can be considered a discrete item). In some aspects, the term "processing pipe" (or "pipe") indicates a file processing service that can be used to ingest data and configure the processing of one or more tasks associated with the data. As used herein, the term "slot" indicates a compute resource unit for a compute node (e.g., a processor core or another compute resource).

The disclosed techniques can be used to configure (e.g., by a file processing manager or FPM) a source monitor for a continuous file processing service that is low latency, cost-effective, and scalable. The disclosed source monitor can be configured using a source monitor configuration based on a source monitor data structure kind that maps to a source monitor definition, scheduling information, and integration information. More specifically, a source monitor definition instance associated with a processing pipeline (e.g., defined by a processing pipeline definition) can be instantiated using the source monitor configuration. The source monitor definition instance can be configured to periodically poll a data source (e.g., a data source associated with the processing pipeline) and fetch one or more notifications (e.g., new or updated data available at the data source). The source monitor definition instance can filter the notifications and determine whether to forward the notifications to one or more work item queues of the processing pipeline and/or one or more additional work item queues of the same or different processing pipeline.

In some aspects, the FPM can also configure a processing pipeline definition (PPD) for the file processing service. In some aspects, the FPM can configure the PPD to include multiple processing configurations (or processing steps) corresponding to a plurality of workloads specified by a manifest file. More specifically, the FPM can configure a pipeline definition service as part of the continuous file processing service. The pipeline definition service can discover and retrieve a manifest file and detect metadata for at least one workload specified by the manifest file. The pipeline definition service can generate a query plan for at least one workload and estimate the number of processing tasks (or jobs) that have to be executed by a compute node to complete at least one workload. A processing configuration (or a step) is generated and can specify the processing tasks (or jobs). In some aspects, the processing configuration can also specify the slots of at least one compute node that can be used to execute the processing tasks. The PPD can be generated as a collection of the configured processing steps. The PPD can be registered and subsequently used to monitor a data source and automatically instantiate a PPD instance (e.g., a processing pipeline) to process any detected data using the processing steps of the PPD. An additional description of the FPM and the configuration of the source monitor and the PPD is provided in connection with FIG. 4-FIG. 12.

The disclosed source monitoring techniques can be used to monitor an external source and initialize one or more processing pipelines. In some aspects, the disclosed source monitoring techniques can be used for processing (e.g., detecting and queuing) continuously arriving work items in a scalable and cost-effective manner. For example, a source monitor definition instance can be configured to continuously poll the cloud provider queues and forward the new files to the pipes that match the pipe's prefix. This polling logic can be specific to file processing, and the poller infrastructure is not generalizable for workloads like Iceberg catalog and KAFKA pull connectors.

In some aspects, the disclosed source monitoring techniques can be associated with the following functionalities:
 (a) Allow workloads to write application-specific source monitoring logic;
 (b) Source monitors can contain multiple steps and can run as a compute service manager (CSM) instance or an execution platform (EP) instance;
 (c) Source monitors can be configured to send the same notification or message to multiple processing pipes;
 (d) The FPM can configure scheduling, managing, and running the source monitors (e.g., the source monitor definition instances); and
 (e) The source monitor configuration can include scheduling information to configure the frequency of execution.

The various embodiments that are described herein are described with reference, where appropriate, to one or more of the various figures. An example computing environment using an FPM is discussed in connection with FIGS. 1-3. Example functionalities of the FPM in connection with configuring discrete workload processing using a source monitor and a PPD are further discussed in connection with FIGS. 4-12. A more detailed discussion of example computing devices that may be used in connection with the disclosed techniques is provided in connection with FIG. 13.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not explicitly described herein. In other embodiments, the computing environment may comprise another type of network-based database system or a cloud data platform. For example, in some aspects, the computing environment 100 may include a cloud computing platform 101 with the network-based database system 102, storage platforms 104, and cloud storage platforms 122. The cloud computing platform 101 provides computing resources and storage resources that may be acquired (purchased) or leased (e.g., by data providers and data consumers) and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the hash-join broadcast decision making functions described herein). The cloud computing platform 101 may include a three-tier architecture: data storage (e.g., storage platforms 104 and 122), an execution platform 110, and a compute service manager 108 providing cloud services. In some embodiments, the execution platform 110 is configured to provide services (e.g., executing file processing jobs 130 configured by a PPD or a source monitor 132 configured based on a source monitor configuration) associated with the continuous file processing service configured by the FPM 128 (e.g., in connection with generating one or more source monitor definition instances associated with a PPD and configuring file processing using a PPD instance).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and files of one or more other types—on, as examples, one or more of their servers and on one or more cloud-storage platforms such as AMAZON WEB SERVICES™ (AWS™), MICROSOFT® AZURE®, GOOGLE CLOUD PLATFORM™, and the like. The customer's servers and cloud-storage platforms are both examples of what a given customer could use as what is referred to herein as an external storage location. The cloud computing platform 101 could also use a cloud-storage platform, which is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations. Internal files can be stored in internal stages at one or more internal storage locations, which can include servers managed and controlled by the same organization (e.g., company) that manages and controls the data platform, and which can instead or in addition include data storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), client device 114 (e.g., a data provider), and data consumer 116 via network 106. The network-based database system 102 is a network-based system used for reporting and analysis of integrated data from one or more disparate sources, including one or more storage locations within the cloud storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed hash-join broadcast decision making functions) to multiple client accounts, including an account of the data provider associated with client device 114 and an account of the data consumer 116. In some embodiments, the execution platform 110 is configured to perform file processing jobs 130, which can be based on PPDs configured using the disclosed techniques. The execution platform 110 can also implement a source monitor 132 (e.g., based on instantiating at least one source monitor definition instance at an execution node). In some aspects, FPM 128 can configure a source monitor 134 at the compute service manager 108 (e.g., based on instantiating at least one source monitor definition instance at the compute service manager 108). A more detailed description of the file processing service functionalities of the FPM 128, including generation of PPDs and configuration of source monitors, is provided in connection with, e.g., FIGS. 4-12.

The compute service manager 108 coordinates and manages operations of the network-based database system 102. The compute service manager 108 also performs query optimization and compilation and manages clusters of computing services that provide computing resources (also referred to as "virtual warehouses"). The compute service manager 108 can support any number of client accounts, such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the network-based database system 102. The data provider may utilize application connector 118 at the client device 114 to submit data storage, retrieval, and analysis requests to the compute service manager 108 as well as to access or configure other services provided by the compute service manager 108 (e.g., services associated with the disclosed file processing service functionalities such as providing one or more configurations used for a source monitor definition instance).

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider (e.g., file processing service functionalities). Additionally, the data consumer can access functions offered by the network-based database system 102 via network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks, such as network 106. The one or more data communication networks may utilize any communication protocol and any communication medium. In some embodiments, the data communication networks are a combination of two or more data communication networks (or sub-networks) coupled with one another. In alternate embodiments, these communication links are implemented using any communication medium and any communication protocol.

The compute service manager 108, metadata database 112, execution platform 110, and storage platform 104 are shown in FIG. 1 as individual discrete components. However, each of the compute service manager 108, metadata database 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operations, the network-based database system 102 processes multiple jobs as determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from and store data to any of the data storage resources in the cloud storage platform 104.

Figure 2:
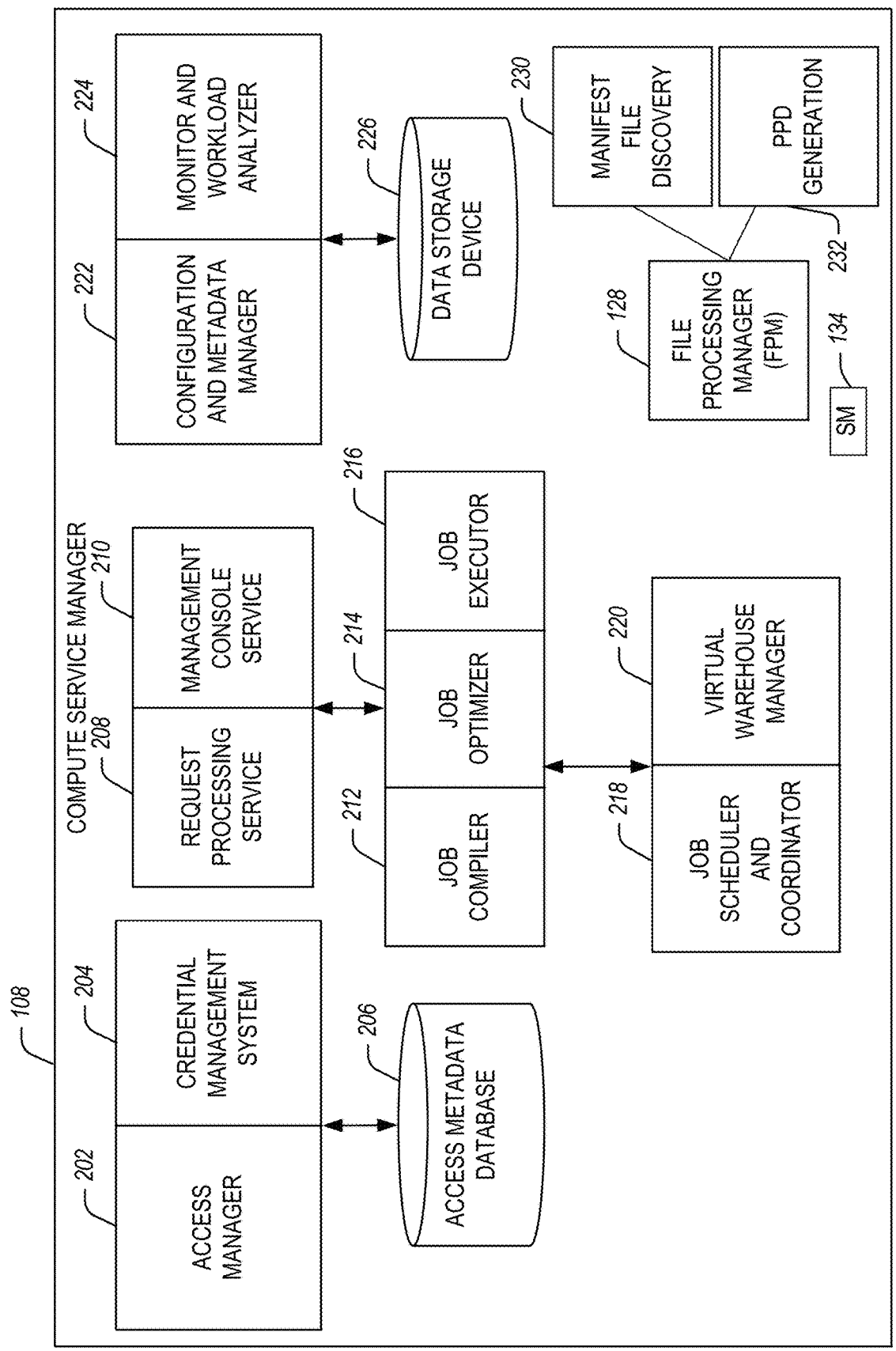
FIG. 2 is a block diagram illustrating the components of a compute service manager including a file processing manager (FPM), in accordance with some embodiments of the present disclosure.

FIG. 2 is a block diagram illustrating the components of the compute service manager 108 including the FPM 128, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources, such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports administrators and other system managers' access to various systems and processes. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in the execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1) may need to communicate with another execution node (e.g., execution node 302-2) and should be disallowed from communicating with a third execution node (e.g., execution node 312-1) and any such illicit communication can be recorded (e.g., in a log or other location). Also, the information stored on a given execution node is restricted to data relevant to the current query, and any other data is unusable, rendered so by destruction or encryption where the key is unavailable.

In some aspects, compute service manager 108 includes the FPM 128. The FPM 128 is configured to perform disclosed techniques in connection with a file processing service using PPDs, including manifest file discovery 230, PPD generation 232 (e.g., as discussed in connection with FIG. 5), and configuration of source monitor 134 (e.g., based on instantiating a source monitor definition instance as discussed in connection with FIGS. 7-9).

Figure 3:
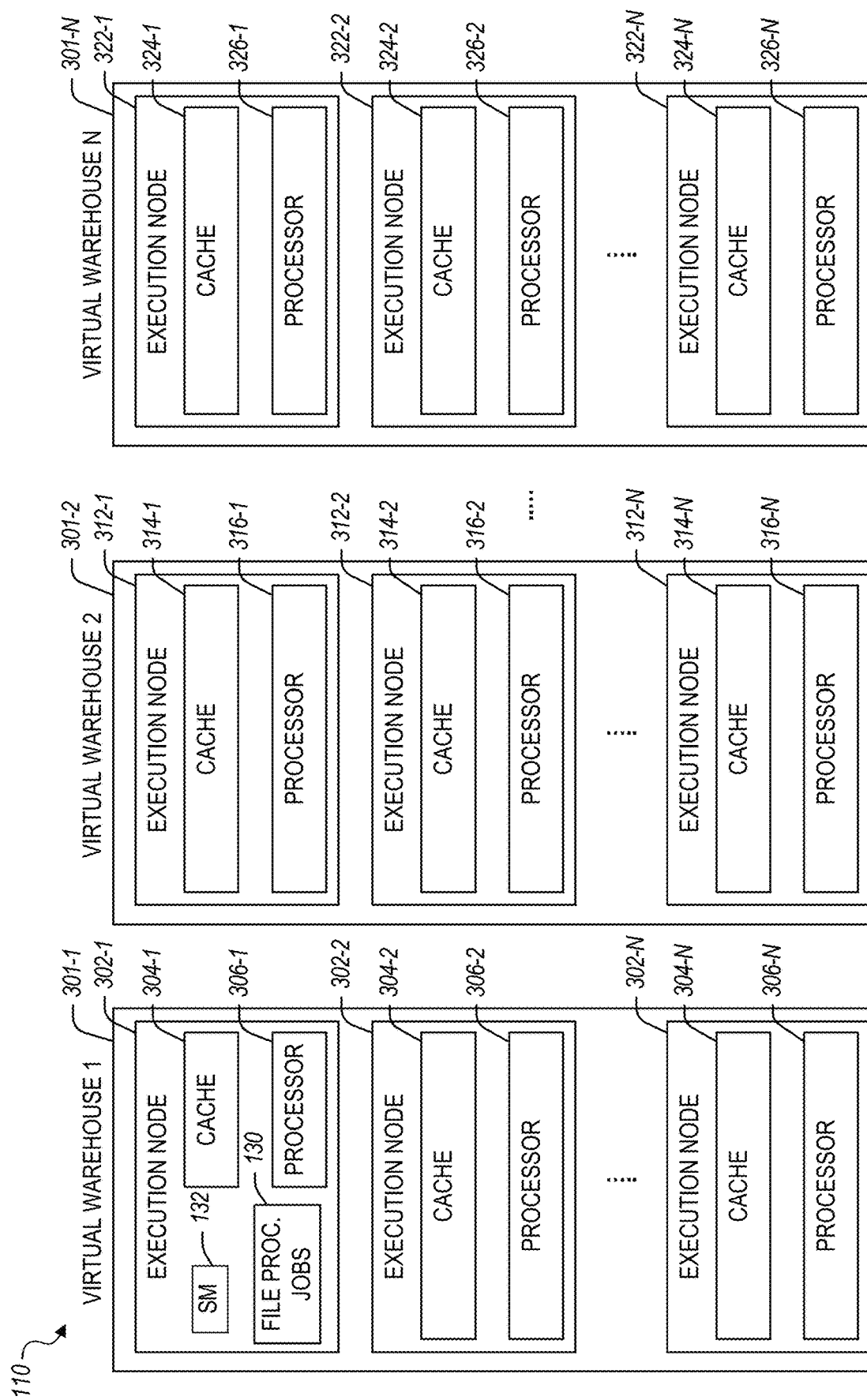
FIG. 3 is a block diagram illustrating components of an execution platform with execution nodes configured to execute file processing jobs and a source monitor, in accordance with some embodiments of the present disclosure.

FIG. 3 is a block diagram illustrating components of an execution platform 110 with execution nodes configured to execute file processing jobs and a source monitor, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, they can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device. Still, the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes: 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes: 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes. This is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, which is helpful for tasks that require fast scanning of large amounts of data. In some embodiments, the cache resources and computing resources associated with a particular execution node are determined when the execution node is created based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , and N may be implemented using multiple computing systems at multiple geographic locations. For example, virtual warehouse 1 can be implemented by a computing system at a first geographic location, while another computing system implements virtual warehouses 2 and n at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and caching resources are needed. Similarly, existing virtual warehouses may be deleted when the resources associated with the virtual warehouse are no longer necessary.

In some embodiments, the virtual warehouses may operate on the same data in the cloud storage platform 104. Still, each virtual warehouse has its execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

In some aspects, FPM 128 can configure one or more of the functionalities discussed in connection with FIG. 4-FIG. 12. For example, FPM 128 can configure a plugin or API that can be used to access the disclosed functionalities, including automating onboarding of new workloads, enabling configuration of PPDs, enabling configurations of source monitors (e.g., one or more source monitor configurations), automating the execution of processing steps configured by PPDs (including automatic sequential or parallel execution of processing steps), and enabling workloads to be self-sufficient for operations (e.g., monitoring and alerting).

Figure 4:
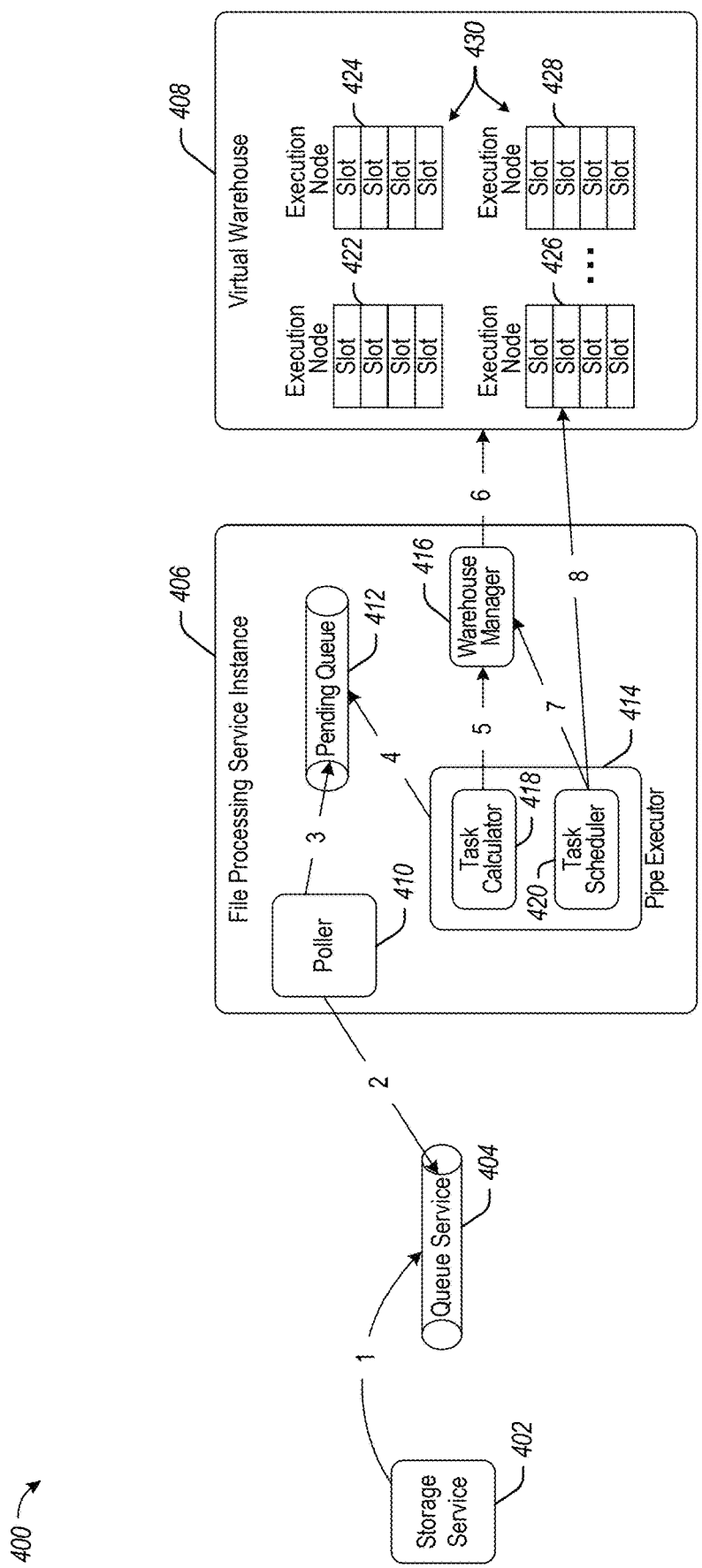
FIG. 4 is a block diagram of a file processing service, in accordance with some embodiments of the present disclosure.

FIG. 4 is a block diagram of a file processing service 400, in accordance with some embodiments of the present disclosure. Referring to FIG. 4, the file processing service 400 includes a storage service 402 (e.g., Amazon S3), a queue service 404 (e.g., Amazon SQS), a file processing service instance 406, and a virtual warehouse 408.

In some aspects, the file processing service instance 406 can be configured as part of the compute service manager 108 and can include a poller 410, a pending queue 412, a pipe executor 414, and a warehouse manager. The pipe executor includes a task calculator 418 and a task scheduler 420.

In some aspects, the virtual warehouse 408 can be any of the virtual warehouses of the execution platform 110 (e.g., as illustrated in FIG. 3). Virtual warehouse 408 can include execution nodes 422, 424, 426, . . . , 428. Each of the execution nodes can be configured with a plurality of slots 430 (e.g., processing cores or other compute resources that can be allocated to individual tasks or processing jobs).

In operation, the storage service 402 sends event notifications for file creation. Poller 410 polls the queue service 404 for new event notifications. Poller 410 then forwards valid notifications to the pending queue 412. The pipe executor 414 can review the pending queue 412 and estimate (e.g., using the task calculator 418) a task count associated with one or more workloads stored as files in the pending queue 412. The estimated task count is sent to the warehouse manager 416. The warehouse manager 416 estimates the warehouse size of a virtual warehouse needed to execute the detected tasks (e.g., the estimation can be based on the task count). Virtual warehouse 408 is selected based on the task count. The task scheduler 420 fetches available slots (of execution nodes in the virtual warehouse 408) from the warehouse manager to schedule tasks and schedule the ingestion of the tasks on the available slots.

Figure 8:
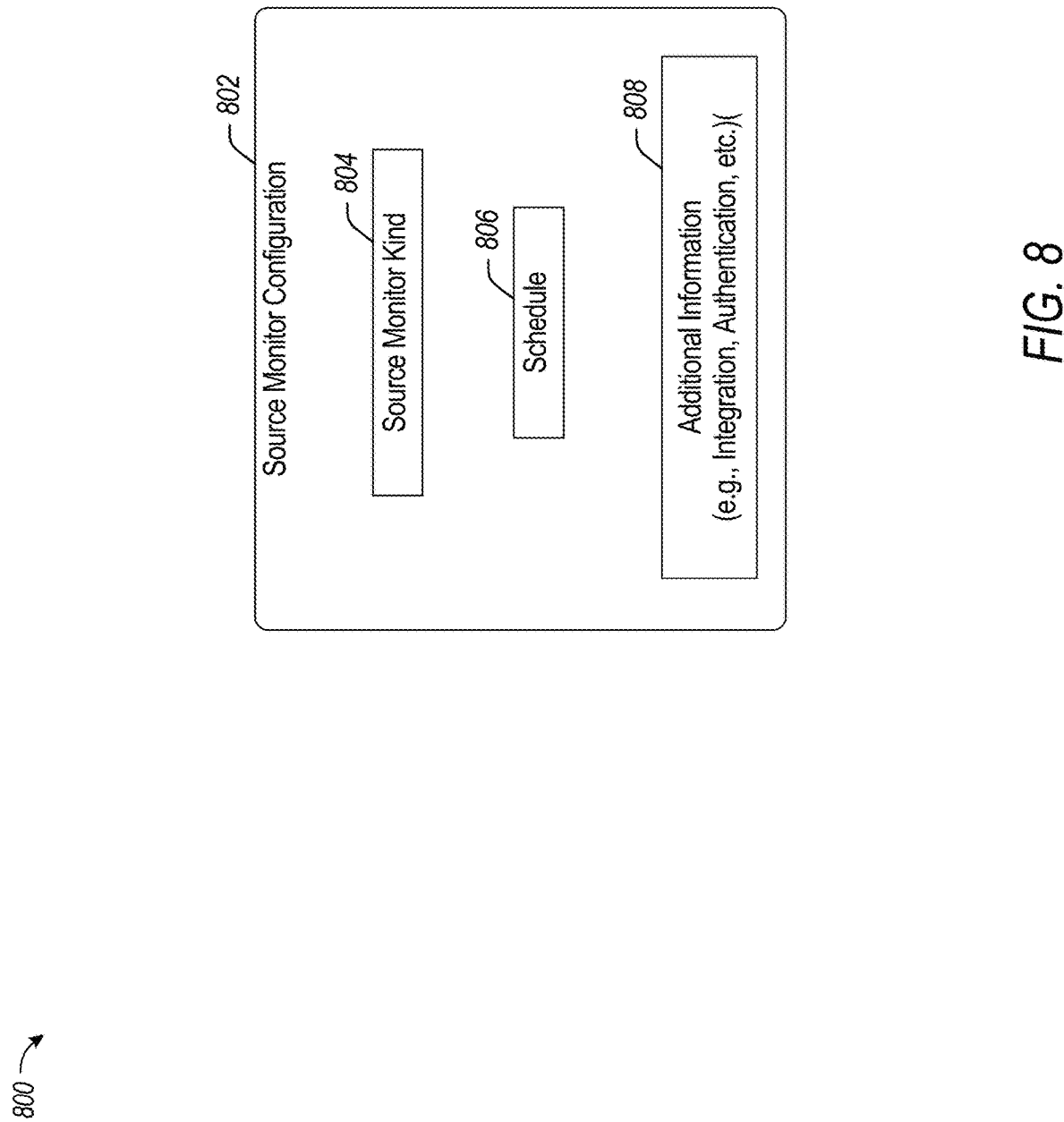
FIG. 8 is a diagram of a source monitor configuration, in accordance with some embodiments of the present disclosure.
Figure 9:
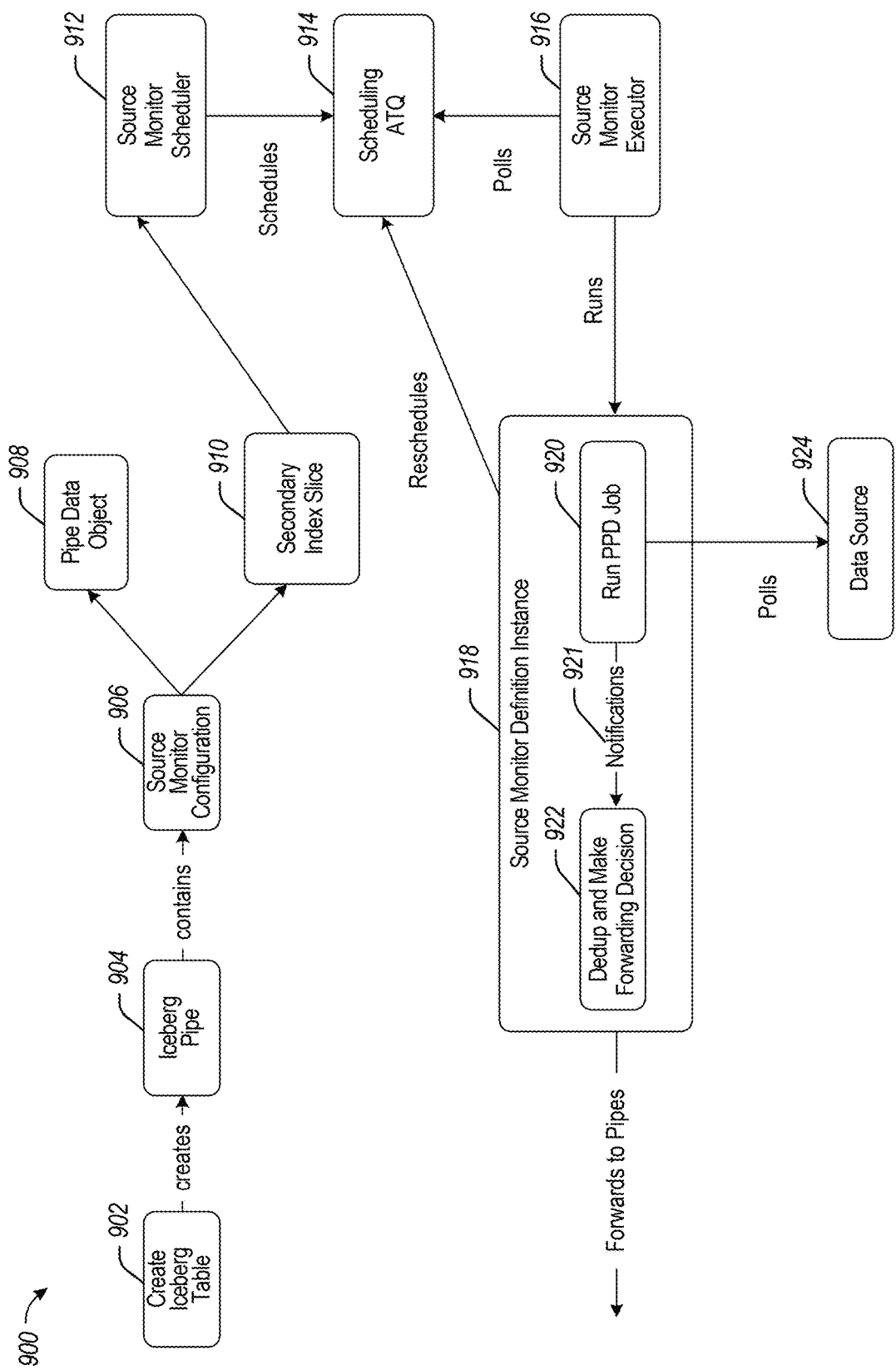
FIG. 9 is a diagram of a system for processing an Iceberg table using a source monitor definition instance, in accordance with some embodiments of the present disclosure.

In some aspects, poller 410 can be configured as a source monitor based on the disclosed techniques (e.g., as discussed in connection with FIGS. 6-12). For example, the functionalities of the poller 410 can be performed by a source monitor definition instance (e.g., as illustrated in FIG. 9).

Figure 5:
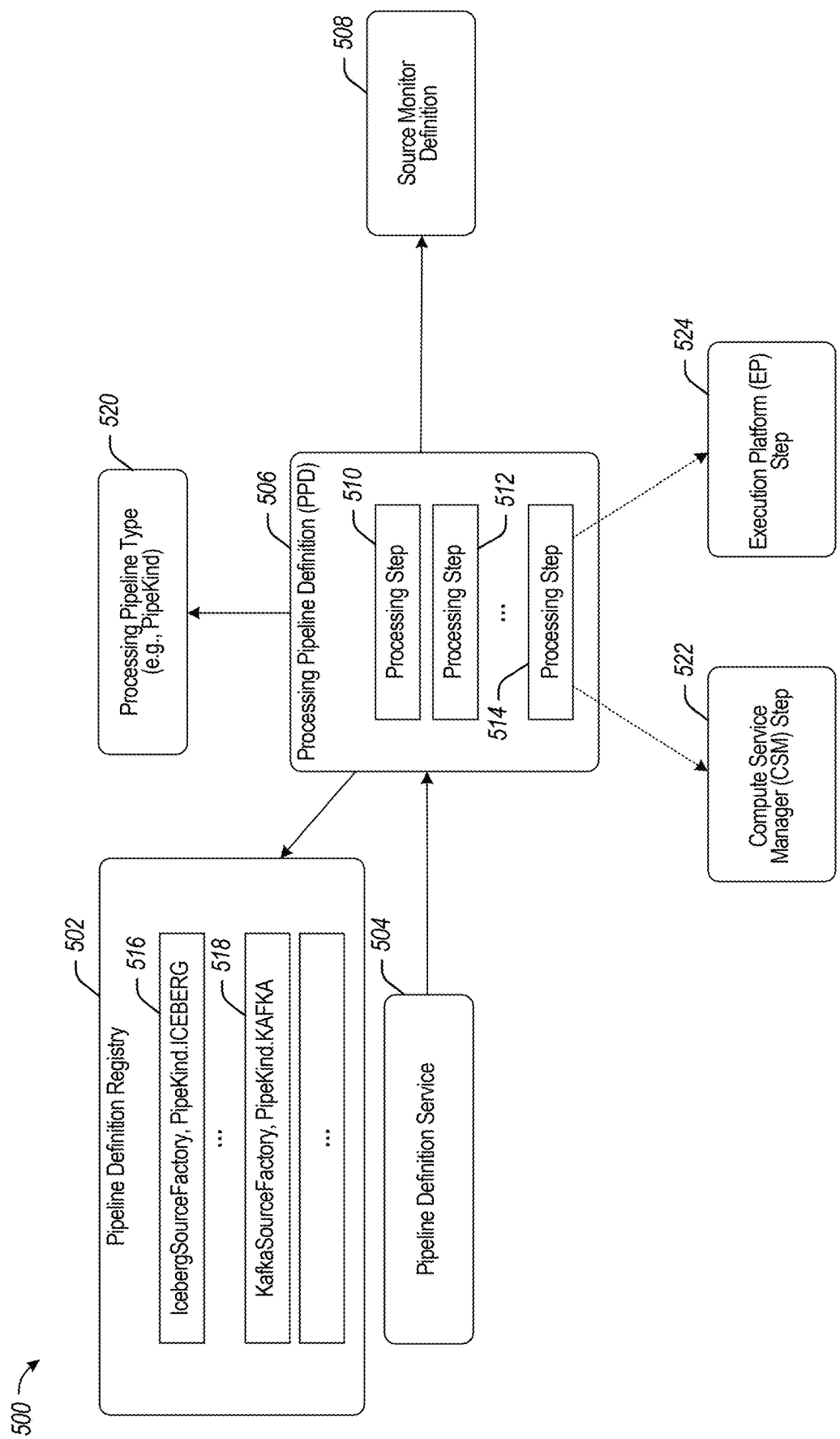
FIG. 5 is a block diagram of a system for configuring a processing pipeline definition (PPD) used by a file processing service, in accordance with some embodiments of the present disclosure.

FIG. 5 is a block diagram of a system 500 for configuring a processing pipeline definition (PPD) 506 used by a file processing service, in accordance with some embodiments of the present disclosure. Referring to FIG. 5, FPM 128 can configure a pipeline definition service 504, which can configure a PPD 506 associated with at least one workload. In some aspects, the at least one workload can be retrieved using a manifest file (e.g., a manifest file detected in the queue service 404 and transferred to the pending queue 412).

In some aspects, the pipeline definition service can include functionalities of the pipe executor 414, including the task calculator 418 and the task scheduler 420. In some aspects, the pipeline definition service 504 can determine tasks associated with a workload (e.g., based on generating a query plan for the workload) and can determine slots in a virtual warehouse that can be used to execute the determined tasks. In some aspects, these functionalities can be configured as processing steps 510, 512, . . . , 514 of the PPD 506 associated with the workload.

In some aspects, at any point in time (e.g., when a new workload is detected), a single instance of a PPD can be configured for a given processing pipe. FPM 128 can execute the set of processing steps 510, . . . , 514 in order if there are work items in the pending queue.

In some aspects, each of the processing steps can be configured as a compute service manager (CSM) step 522 or as an execution platform (EP) step 524.

In some aspects, the CSM step 522 is configured to execute at the compute service manager 108 and can be associated with the following functionalities:
  (a) Can be configured to call out to external or internal services;
  (b) Can be configured as single-threaded;
  (c) Can be configured to execute without parallelism; and
  (d) Can be avoided for resource-intensive operations.

In some aspects, the EP step 524 is configured to execute at the execution platform 110 and can be associated with the following functionalities:
  (a) Creates processing jobs that run on execution nodes of the execution platform 110;
  (b) Each of the processing steps of the PPD 506 can have a different query plan and associated processing jobs that can be configured to execute sequentially and/or in parallel using one or more slots (e.g., processing cores) of one or more execution nodes of the execution platform 110;
  (c) Each of the processing steps of the PPD 506 can be configured to scale differently;
  (d) The processing jobs of one or more of the processing steps can be configured to execute based on full parallelism of the file processing system; and
  (e) Each of the processing steps can include one or more configurations for handling processing job failures.

In some aspects, FPM 128 can configure PPD 506 to also include configuration information indicating job completion or checkpoint configurations (e.g., configuring one or more functionalities to be performed or outputs generated at a specific checkpoint during the execution of the processing steps 510, . . . , 514 or after completion of the processing steps).

In some aspects, users can decide to poll the source and either push a work item to the pipe directly for processing based on the PPD or requeue the source monitor for execution.

In some aspects, the pipeline definition service 504 can be configured with a factory interface used to construct an instance of a PPD. The workload can provide an implementation. In some aspects, the job factory definition can be registered with the pipeline definition registry 502.

In some aspects, an instance of the PPD can be configured for a given entity ID. The entity ID can be a processing pipeline ID for which a processing job is being created. In some aspects, implementations may use this as an opportunity to either create a new instance per invocation, share an instance across invocations, or implement a singleton across all processing pipes. Depending on the option chosen, different levels of optimizations and consolidation of work can be done.

In some aspects, a workload (and the corresponding PPD, such as PPD 506) can be associated with a processing pipeline type 520 (also referred to as PipeKind). In some aspects, the processing pipeline type 520 can include an Iceberg type (e.g., when the data is Apache Iceberg tables data stored in an Iceberg catalog), KAFKA type (e.g., when the data is KAFKA topic or another type of KAFKA data), or another type.

In some aspects, the PPD 506 and its associated processing pipeline type 520 can be registered in the pipeline definition registry 502, creating a definition registration. For example, pipeline definition registry 502 includes definition registrations 516, . . . , 518. A definition registration can be used to generate (or instantiate) a PPD instance and configure pipeline processing of the type indicated by the processing pipeline type 520. In some aspects, the processing pipeline type 520 (e.g., as indicated in a definition registration) can be used to configure specific (e.g., pre-defined) compute resources (e.g., a specific execution node or nodes, specific number of slots/cores of the execution node, and/or other types of compute resources) that can be used for executing the processing jobs associated with one or more steps of the PPD.

In some aspects, any of the definition registrations can be used to obtain a corresponding PPD from the registration as a pre-configured PPD based on the data type for a new workload (e.g., the workload data type can be matched with the processing pipeline type of a definition registration, and the corresponding PPD of the definition registration can be used to process the workload).

In some aspects, new workloads will extend the PPD abstraction and provide the steps necessary to process a work item. The core logic of the workload can be configured as part of the processing steps of the PPD.

In some aspects, a new workload can be associated with a corresponding pipe kind, and instances of that kind (pipe instance) to which work items will be pushed (similar to file ingestion performed by a file processing system).

For example, a KAFKA pull connector instance can be associated with a processing pipe that a user can create, pointing to a source and the inline transformations. When there are one or more pending items in the pending slice of this pipe, the FPM 128 can schedule a PPD instance (if one is not already running) and execute the steps of the PPD.

In some aspects, a given processing pipe associated with a PPD can have at most one instance of a PPD active at a time. In some aspects, more than one instance of the job can be configured, or nested jobs can be configured.

In some aspects, a PPD can be initialized the same way that ingest works, which is that a work item can be pushed to a processing pipe. In some aspects, a monitoring and initialization mechanism can be implemented by a workload by authoring a separate PPD as the source monitor definition.

In some aspects, a work item class can be used to pass work across processing steps and can be based on the following pseudo code listed in Table 1 below.

TABLE 1

```java
Java
/** Represents a work item for a step in a PipeDefinition */
public class WorkItem {
/** Blob that has serialized workload-specific data for the work item */
private final byte[ ] data;
/**
User-specified properties for this work item. This will help avoid deserializing the
blob to look up information that could be useful for batching work during the
processing of a step.
*/
private Map<String, Object> properties;
public WorkItem(byte[ ] data) {
   this.data = data;
}
public WorkItem(byte[ ] data, Map<String, Object> properties) {
   this(data);
   this.properties = properties;
}
/** Gets the workload specific data */
public byte[ ] getData( ) {
   return data;
}
/** Gets a property value */
public Object getProperty(String key) {
   return this.properties.getOrDefault(key, null);
}
}
```

In some aspects, work items originating from the processing pipe's database-backed queue are represented using a Source WorkItem class. In some aspects, these work items have identifiers assigned by the file processing service, which will help the workload mark work items as complete and remove them from the pending queue. In some aspects, the Source WorkItem class can be configured based on the pseudo code listed in Table 2 below.

TABLE 2

```java
/**
Implementation for the original work item that was queued to the pipe. The
addition is an ID that is assigned to the work item, which will be later
used for completion (removing the item from the queue).
*/
public final class SourceWorkItem extends WorkItem {
    /** Id assigned to this work item by the file processing system */
    private String id;
    SourceWorkItem(String id, byte[ ] data) {
        super(data);
        this.id = id;
    }
    /** get the Id for the work item */
    public String getId( ) {
        return id;
    }
}
```

In some aspects, PPD 506 can be associated with a source monitor definition 508, which can be used to configure a source monitor (e.g., as discussed in greater detail in connection with FIG. 6-FIG. 9). In some aspects, the source monitor definition 508 can be implemented as a pipe processing job. It can be executed/run on a schedule.

Figure 6:
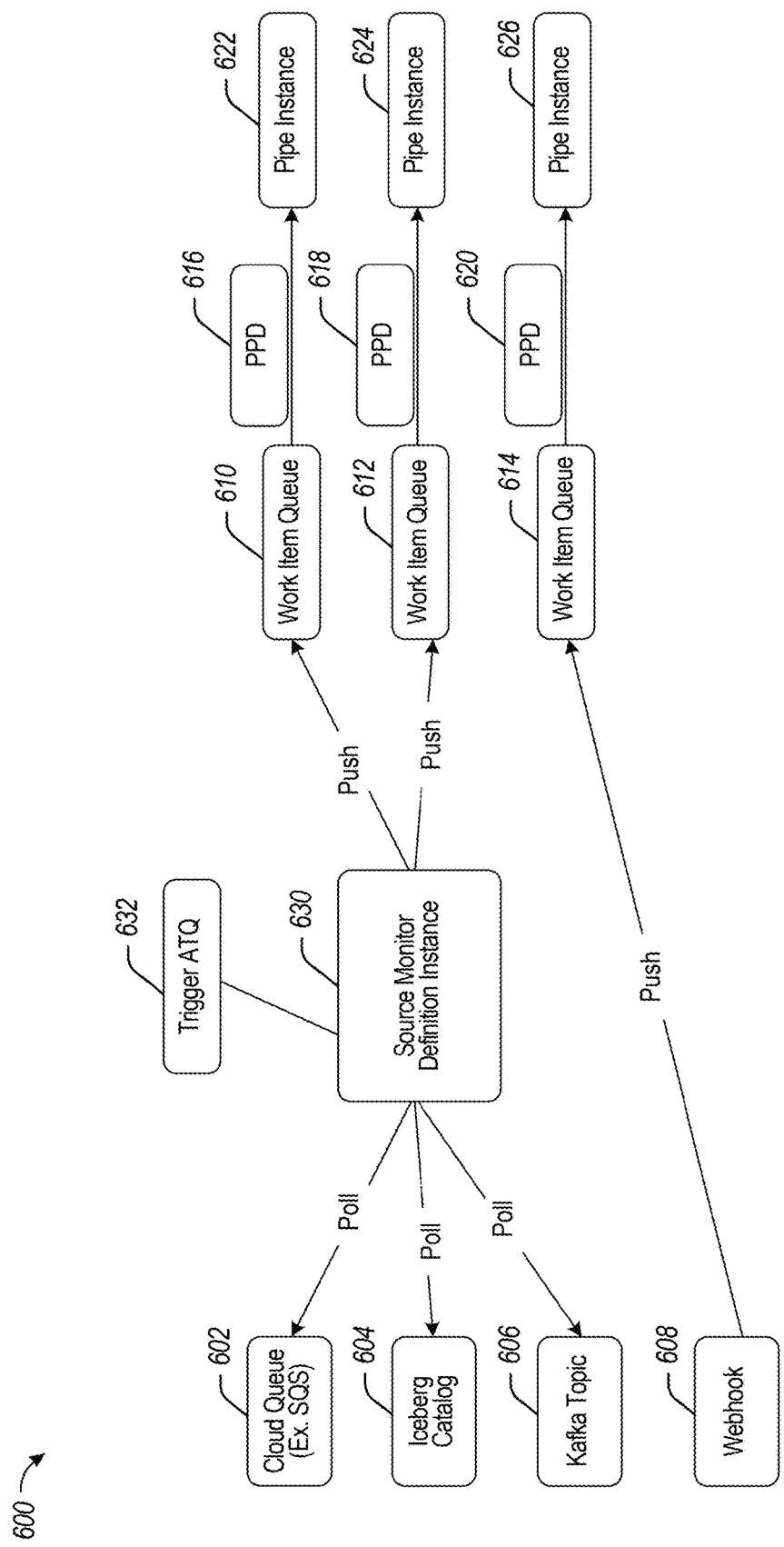
FIG. 6 is a block diagram of a source monitor definition instance associated with a PPD in a file processing service, in accordance with some embodiments of the present disclosure.

FIG. 6 is a block diagram 600 of a source monitor definition instance associated with a PPD in a file processing service, in accordance with some embodiments of the present disclosure. Referring to FIG. 6, the source monitor definition instance 630 can be configured (e.g., based on a source monitor configuration as illustrated in FIG. 8) to monitor and poll data sources to detect the presence of new or updated data. In some aspects, the source monitor configuration is based on a source monitor definition (e.g., source monitor definition 508).

For example, source monitor definition instance 630 can poll cloud queue 602 (e.g., Amazon SQS), an Iceberg catalog 604, and a KAFKA topic 606. Detected new/updated data can be pushed to corresponding work item queues 610 and 612 (e.g., in the form of manifest files, based on the type of data that is fetched). In some aspects, new or updated data can be directly pushed into a queue (e.g., webhook 608 pushes data directly into work item queue 614 without the use of the source monitor definition 508).

In some aspects, the Iceberg catalog 604 can include one or more snapshots. In some aspects, the KAFKA topic 606 includes partitions. Multiple partitions can be pushed to the same work item queue. A KAFKA pull-based connector of the source monitor definition instance 630 can reserve a slot for each partition and indicate the number of slots needed to process the pulled partition(s) once they are stored in the work item queue.

The source monitor definition instance 630 can monitor for new data and push the detected data to a work item queue, as well as provide an indication of the pushed data type so that a processing pipe instance of the same kind can be instantiated using a PPD.

Work item queues 610, 612, and 614 can be used (e.g., by the pipeline definition service 504) to generate corresponding PPDs 616, 618, and 620. Corresponding pipe instances (or PPD instances) 622, 624, and 626 can be configured based on PPDs 616, 618, and 620.

In some aspects, the source monitor definition instance 630 can be instantiated based on a trigger asynchronous task queue (ATQ) 632. For example, the trigger ATQ 632 can be configured to instantiate/trigger source monitor definition instance 630 periodically or at a specific instance.

Figure 7:
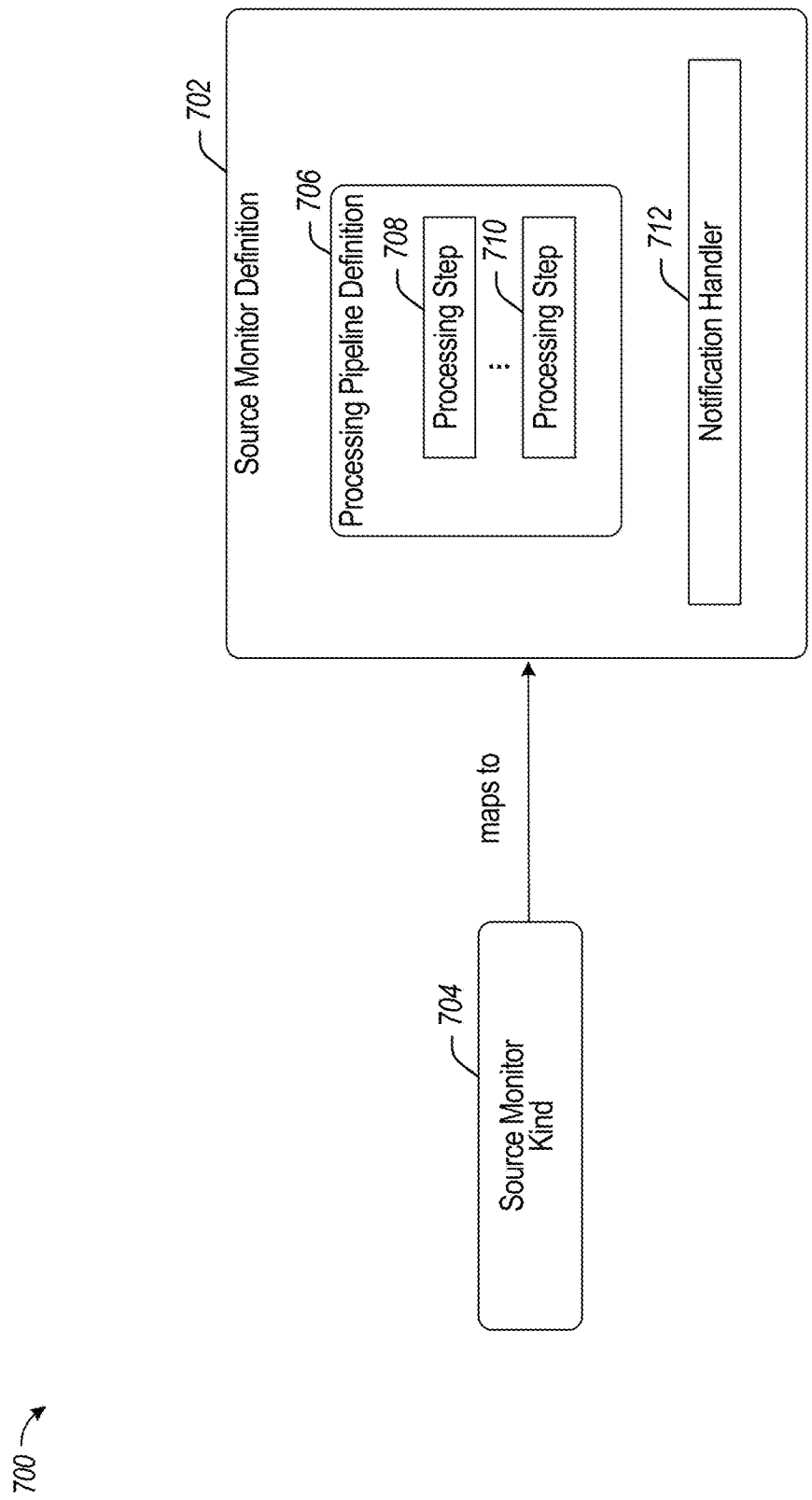
FIG. 7 is a diagram of a source monitor kind data structure that maps to a source monitor definition, in accordance with some embodiments of the present disclosure.

FIG. 7 is diagram 700 of a source monitor kind data structure that maps to a source monitor definition, in accordance with some embodiments of the present disclosure. Referring to FIG. 7, the source monitor kind data structure 704 (also referred to as a source monitor kind or SourceMonitorKind) can be mapped to a source monitor definition 702. In some aspects, the source monitor definition 702 includes PPD 706 with processing steps 708, . . . , 710. In some aspects, the PPD 706 can be configured as a multi-step processing job to fetch notifications.

In some embodiments, a new source monitor can be created by adding a new kind to the source monitor kind and defining an associated source monitor definition 702 (also referred to as SoureMonitorDefinition). The pipe's definition can determine the source monitor kind for the pipe. As an example, an unmanaged Iceberg table pipe (which uses a Glue catalog) will return ICEBERG_SOURCE_GLUE_CATALOG kind, whereas a pipe using a different catalog will return a kind corresponding to it.

In some embodiments, each of processing steps 708, . . . , 710 can be performed as a CSM step 522 or an EP step 524.

In some aspects, the source monitor definition 702 also includes a notification handler 712, which can be configured to handle matching, deduplicating, and forwarding notifications to one or more pipes. The notification handler 712 can be configured to filter the notifications fetched by the processing steps of PPD 706. As used herein, the term "notification" can include new or updated data that is detected as available at a data source or a message indicating the availability of such new or updated data.

In some aspects, the notification handler 712 is further configured to perform the following functionalities:
  (a) determine whether the notification is associated with data that should be skipped (e.g., ignored) or processed;
  (b) forward the notifications to one or more processing pipes that match (e.g., one or more matching criteria) for a specific notification;
  (c) determine whether the fetched data should be stored as single or multiple items in a work item queue;
  (d) determine whether the fetched data should be stored in a single or multiple work item queues; and
  (e) determine whether to perform deduplication.

In some aspects, a SourceMonitorDefinition can be configured as a specialized extension of a processing pipe job. In some aspects, a processing pipe job is initialized when there is a work item in the pending queue. In comparison, source monitors have an implicit perpetual work item in the pending queue and can always be running. a SourceMonitorConfiguration, which is defined by the pseudo code in Table 3 below, is the implicit work item that is used to start the monitoring.

In some aspects, a source monitor can be configured to provide match criteria or conditions that can be evaluated against incoming notifications to determine if it matches any active pipe. If deduplication is required, it can be done in this layer. Upon receiving the notifications from the steps defined in the base PPD, the notification is pushed via a forward notifications method. This method uses the match condition to determine the pipes to forward the notification to and will enqueue it to the pipe's pending queue.

An example pseudo code for configuring a source monitor definition is listed in Table 3 below.

TABLE 3

```
public abstract class SourceMonitorDefinition extends PipeDefinition {
SourceMonitorDefinition(MatchCondition matchCondtion) {
/**
Initialize match condition
*/
}
public MatchCondition getMatchCondition( ) {
// Returns the match condition which needs to be used for
}
/**
Implementation of forwardNotifications method.
Forward notifications support at least once semantics
Returns SourceMonitorResult which contains the following information.
   Status (Success/Failure)
   ErrorDetails (if failure)
   List of notifications that result is applicable to.
*/
SourceMonitorResult forwardNotifications(List<Notification> notifications) {
MatchConditon matchCondition = getMatchCondition( );
// Get the pipes that are associated with source monitor configuration.
List<Long> pipeIds = getPipes(sourceMonitorConfiguration)
// If notification matches to a pipe, then forward it.
for (notification : notifications) {
for (pipeId : pipeIds) {
if (matchCondition.matchNotification(pipeId, notification)) {
pushWorkItemToPipe(pipeId, notification.toWorkItem( ));
}
}
}
}
}
public abstract class MatchCondition {
boolean matchNotification(long pipeId, T notification) {
// Returns true if the current notification matches for a pipe, else
returns false.
// If match returns true then the notification will be translated to a work
item and
// written to the pipe's pending queue.
// Workloads which require de-duplication can handle it in this layer.
}
}
/**
Factory interface used to construct an instance of SoureMonitorDefinition. An
the workload provides implementation.
Factory should be registered with the PipeDefinitionRegistry.
*/
public class SoureMonitorDefinitionFactory {
public SoureMonitorDefinition getInstance(SoureMonitorConfiguration
configuration)
}
```

FIG. 8 is diagram 800 of a source monitor configuration 802, in accordance with some embodiments of the present disclosure. Referring to FIG. 8, the source monitor configuration 802 can be associated with a pipe dictionary object. It can be used to encapsulate information that can be used to start a source monitor (e.g., by instantiating a source monitor definition instance). More specifically, source monitor configuration 802 includes credentials/integrations for the monitoring job as well as frequency/lag between runs.

In some aspects, the credentials/integrations for the monitoring job can be a source monitor kind 804, which maps to a source monitor definition (e.g., source monitor definition 702). The source monitor kind 804 can be used for instantiating a source monitor definition instance based on the source monitor configuration it maps to.

The source monitor configuration 802 also includes scheduling information 806, which can indicate the frequency/lag between successive monitoring job runs. In some aspects, the scheduling information 806 can be user-defined. In other aspects, the scheduling information 806 can be system-defined. In some aspects, the schedule of the trigger ATQ 632 can be used to schedule monitoring job runs In some aspects, the source monitor configuration 802 includes additional information 808, which can include integration information associated with the data source. In some aspects, the integration information can include authentication information which can be used for accessing the data source to perform polling for new/updated data stored in the data source during at least one notification fetching job (e.g., during one or more of the processing steps 708, . . . 710 of PPD 706).

In some aspects, a source monitor configuration is associated with a pipe dictionary object, and it is used to encapsulate the information that is required to start the monitoring job. More specifically, it has an ID, credentials/integrations needed by the monitor, and frequency/lag between runs. This information can be used to create an instance of a source monitor definition and schedule it. If multiple pipes share the same configuration, then such configuration can be optimized and run efficiently.

In some aspects, the following pseudo code in Table 4 can be used to generate a source monitor configuration.

TABLE 4

```
public abstract class SoureMonitorConfiguration {
// Return the kind for the SourceMonitor.
SoureMonitorKind getSoureMonitorKind( ) {
// Kind will determine the SoureMonitorDefinition that will be used for this pipe.
}
// Returns a unique id for the running monitor.
String getSourceMonitorId( ) {
// Pipe's sharing the same configuration should preferably return the same id
// for efficient scheduling.
}
// Get the lag duration.
Duration getLagDuration( )
```

FIG. 9 is a diagram of a system 900 for processing an Iceberg table using a source monitor definition instance, in accordance with some embodiments of the present disclosure. Referring to FIG. 9, system 900 can be based on user-defined configurations, including an Iceberg table 902 and Iceberg pipe configuration 904. The Iceberg pipe configuration 904 includes a source monitor configuration 906, which can be persisted as a metadata object (e.g., as a pipe data object 908) in a metadata store. The source monitor configuration 906 is also persisted in a secondary index slice 910 (e.g., for scheduling).

The FPM can activate a source monitor scheduler 912 which schedules instantiation of a source monitor via the scheduling ATQ 914. A source monitor executor 916 polls the scheduling ATQ 914 and instantiates (e.g., runs) the source monitor definition instance 918 as scheduled by the scheduling ATQ 914. In some aspects, the source monitor definition instance 918 is instantiated based on the source monitor configuration 906 (which can be similar to the source monitor configuration 802 of FIG. 8).

The source monitor definition instance 918 can execute a PPD job at operation 920 (e.g., based on executing one or more of the processing steps of the PPD associated with the source monitor definition) to obtain one or more notifications 921 by polling the data source 924. The source monitor definition instance 918 can perform deduplication and forwarding decisions 922 based on the one or more notifications 921 (e.g., using the notification handler 712). The source monitor definition instance 918 then forwards data associated with the one or more notifications 921 to at least one work item queue associated with the Iceberg pipe configuration 904 (e.g., persistent work queue 1104 of FIG. 11).

In some aspects, notifications 921 returned by executing operation 920 can implement the interface associated with the pseudo code listed in Table 5 below. In some aspects, the interface contains methods that can be used to deduplicate and schedule the notification as a work item.

TABLE 5

```
public interface SourceMonitorNotification {
/**
Notification id used to dedup notifications.
*/
public String getNotificationId( ) {
}
/**
Convert notification to pipe workItem.
*/
public WorkItem toWorkItem( ) {
}
}
```

Figure 10:
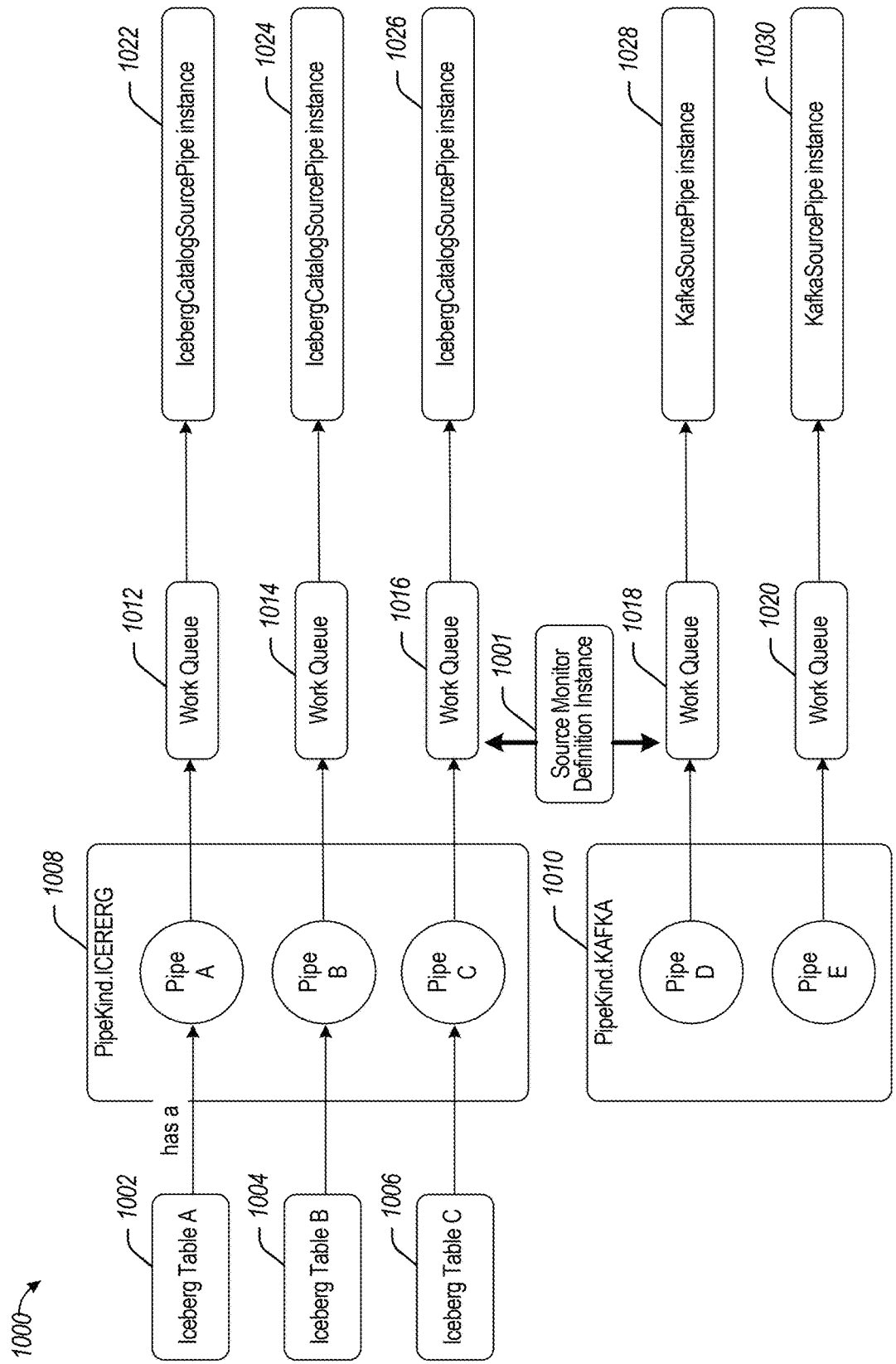
FIG. 10 is a block diagram of processing data by multiple PPD instances associated with different processing pipeline types, in accordance with some embodiments of the present disclosure.

FIG. 10 is a block diagram 1000 of processing data by multiple PPD instances associated with different processing pipeline types, in accordance with some embodiments of the present disclosure. Referring to FIG. 10, workload data from Iceberg tables 1002, 1004, and 1006 is associated with processing pipeline type 1008 (e.g., Iceberg table type, also referred to as PipeKind.Iceberg). Iceberg data from Iceberg tables 1002, 1004, and 1006 is loaded in corresponding work queues 1012, 1014, and 1016. Corresponding PPD instances 1022, 1024, and 1026 are instantiated and used to process the Iceberg data from work queues 1012, 1014, and 1016.

Similarly, KAFKA-related data can be associated with processing pipeline type 1010 (e.g., KAFKA type, also referred to as PipeKind.KAFKA). KAFKA data is loaded in work queues 1018 and 1020. Corresponding PPD instances 1028 and 1030 are instantiated and used to process the KAFKA data from work queues 1018 and 1020.

In some aspects, a source monitor definition instance 1001 (which can be similar to source monitor definition instance 630 or source monitor definition instance 918) can be configured to poll for new data and fetch such data into work queues 1012-1020.

Figure 11:
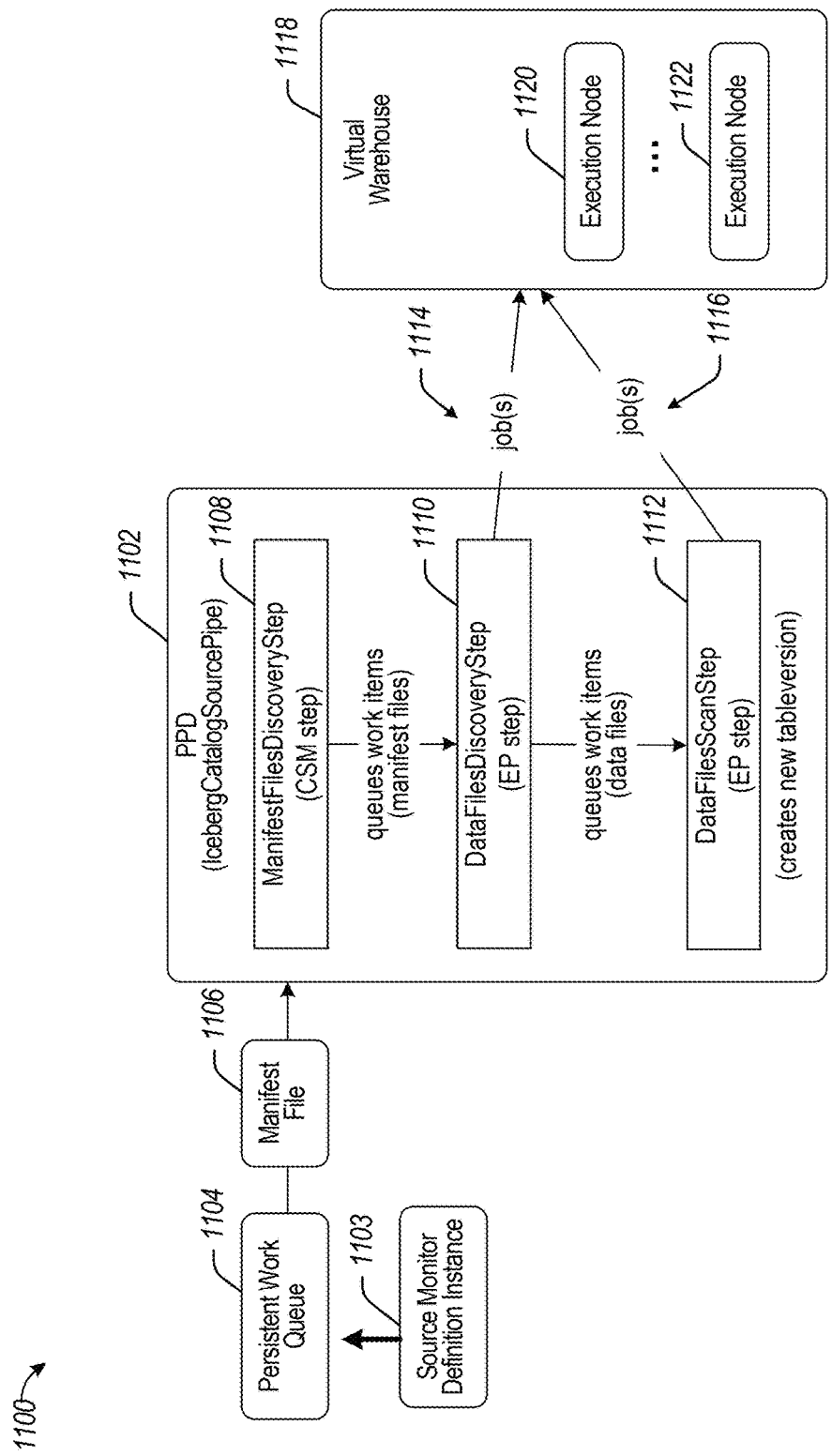
FIG. 11 is a block diagram of a PPD used in connection with processing Apache Iceberg data, in accordance with some embodiments of the present disclosure.

FIG. 11 is a block diagram 1100 of a PPD 1102 used in connection with processing Apache Iceberg data, in accordance with some embodiments of the present disclosure. Referring to FIG. 11, source monitor definition instance 1103 monitors a data source (not illustrated in FIG. 11) and fetches any newly detected data into the persistent work queue 1104. When new (or updated) data is present in the persistent work queue 1104, such data is retrieved as a manifest file 1106.

PPD 1102 is generated based on one or more workloads specified by the manifest file 1106. More specifically, a first processing step 1108 can be configured as a CSM step to fetch work items from a pending queue (e.g., persistent work queue 1104) and enqueue the fetched items (e.g., manifest file 1106) for processing by the next step. In some aspects, the following pseudo code in Table 6 can be used to configure processing step 1108:

TABLE 6

```java
Java
/** Step - 1 */
public class ManifestFilesDiscoveryStep implements CSMStep {
public ManifestFilesDiscoveryStep(CSM Step nextStep) {
super(StepType.CSM_MODE);
}
/** Process one metadata file at a time. For each metadata file, the snapshots are
listed, and a work item is queued for each snapshot.
*/
public void processWorkItems(List<WorkItem> workItems) {
/**
For the given snapshot, discover all the manifest files, a dedup is performed, and
the new manifest files are identified in the snapshot. The next step's inbox is
obtained, and all the manifest files are stored. The manifest files are saved in the
work item's scratch space (can be used during re-run to skip execution)
*/
    nextStep.queueWork(/** new work item */)
  }
}
```

In some aspects, PPD 1102 is configured with a second processing step 1110, which can be configured as an EP step. aspects, the following pseudo code in Table 7 can be used to configure the second processing step 1110:

TABLE 7

```
/** Step - 2 */
public class DataFilesDiscoveryStep implements EPStep {
    List<String> dataFilePaths;
    public DataFilesDiscoveryStep(File Processing System Step nextStep) {
        super(StepType.XP_MODE);
}
/**
* The compiled query plan will contain a single step, which will take
* a continuous scanset. Scanset will accept a list of manifest files
* and the data files can be discovered in EP.
*/
IProgramGenerator getProgramGenerator( ) {
// compile and return the query plan.
}
override List<WorkItem> getWorkItemBatch(int batchSize) {
// return "batchSize" number of items
}
/**
* Task estimation will be based on the number of manifest files.
* Discovery of data files in manifest files can happen in parallel.
*/
ITaskCountCalculator getTaskCountCalculator( ) {
// return task count based on the number of manifest files
}
void processStepProgress(StepProgressData progressData) {
/**
Write the data files that have been discovered on the work item's scratch
Space. Mark the manifest files that have been completed in the work item's
scratch space. In the case of a re-run, use the information to skip partial/full
execution.
*/
}
void processStepCompletion(StepCompletionData completionData) {
// Write an end marker and move the items in the work item's scratch space
// to the next step's inbox
// queue work items to the next step
nextStep.queueWork(/** new work items from dataFilesPath */)
}
}
```

More specifically, the second processing step 1110 obtains work items from the first processing step, gets (or generates) a query plan for the obtained work items, and estimates required tasks based on the work items. The second processing step 1110 can also configure checkpoint progress and task completion configurations (e.g., what functionalities to perform at a given checkpoint and the completion of the processing jobs 1114 associated with the tasks of the work items specified in the second processing step). In some In some aspects, PPD 1102 is configured with a third processing step 1112, which can be configured as an EP step. More specifically, the third processing step 1112 obtains work items from the second processing step. It generates or performs the following functions: determine/obtain a number of tasks/items in the query plan, compile the query plan, task estimation and task count generation based on the number of manifest files associated with the workload, and perform pre-configured functions/steps during execution of processing jobs 1116 or at completion time after processing jobs 1116 have been completed. In some aspects, the following pseudo code in Table 8 can be used to configure the third processing step 1112:

TABLE 8

```
/** Step - 3 */
public class DataFilesScanStep implements EPStep {
public DataFilesScanStep( ) {
super(StepType.XP_MODE);
}
override List<WorkItem> getWorkItemBatch(int batchSize) {
// return "batchSize" number of items
}
/**
* The compiled query plan will contain a single step, which will take
* a continuous scanset. Scanset will accept a list of manifest files
* and the data files are discovered in EP
*/
IProgramGenerator getProgramGenerator( ) {
// compile and return the query plan.
}
/**
* Task estimation will be based on the number of manifest files.
* Discovery of data files in manifest files can happen in parallel.
*/
ITaskCountCalculator getTaskCountCalculator( ) {
// return task count based on the number of manifest files
}
void processStepProgress(StepProgressData progressData) {
/**
Write the EP file info that has been written in the work item's scratch
Space. Mark the data files that have been completed in the work item's scratch
Space. In the case of a re-run, use the information to skip partial/full execution.
*/
}
void processStepCompletion(StepCompletionData completionData) {
/**
Write a new table version for all the EP files. Schedule cleanup of scratch spaces
and inbox for all steps. Finish work item and remove from queue.
*/
}
}
```

In some aspects, PPD 1102 can include configurations to specify one or more slots of at least one of execution nodes 1120, . . . , 1122 in virtual warehouse 1118 to perform processing jobs 1114 and 1116.

FIG. 12 is a flow diagram illustrating the operations of a database system in performing a method 1200 for configuring a source monitor, in accordance with some embodiments of the present disclosure. Method 1200 may be embodied in computer-readable instructions for execution by one or more hardware components (e.g., one or more processors) such that the operations of method 1200 may be performed by components of network-based database system 102, such as components of the execution platform 110 (e.g., the FPM 128) and/or the compute service manager 108 (which components may be implemented as machine 1300 of FIG. 13). Accordingly, method 1200 is described below, by way of example with reference thereto. However, it should be noted that method 1200 may be deployed on various other hardware configurations and is not intended to be limited to deployment within the network-based database system 102.

At operation 1202, FPM 128 generates a processing pipeline definition (e.g., PPD 706). The processing pipeline definition includes a plurality of configurations associated with a corresponding plurality of notification fetching jobs (e.g., as configured by processing steps 708, . . . , 710).

At operation 1204, FPM 128 generates a source monitor definition based on the processing pipeline definition. For example, FPM 128 generates source monitor definition 702 based on the PPD 706.

At operation 1206, FPM 128 instantiates a source monitor definition instance based on the source monitor definition.

At operation 1208, FPM 128 causes fetching of one or more notifications associated with a data source based on executing at least one notification fetching job of the plurality of notification fetching jobs configured in the source monitor definition instance.

Figure 13:
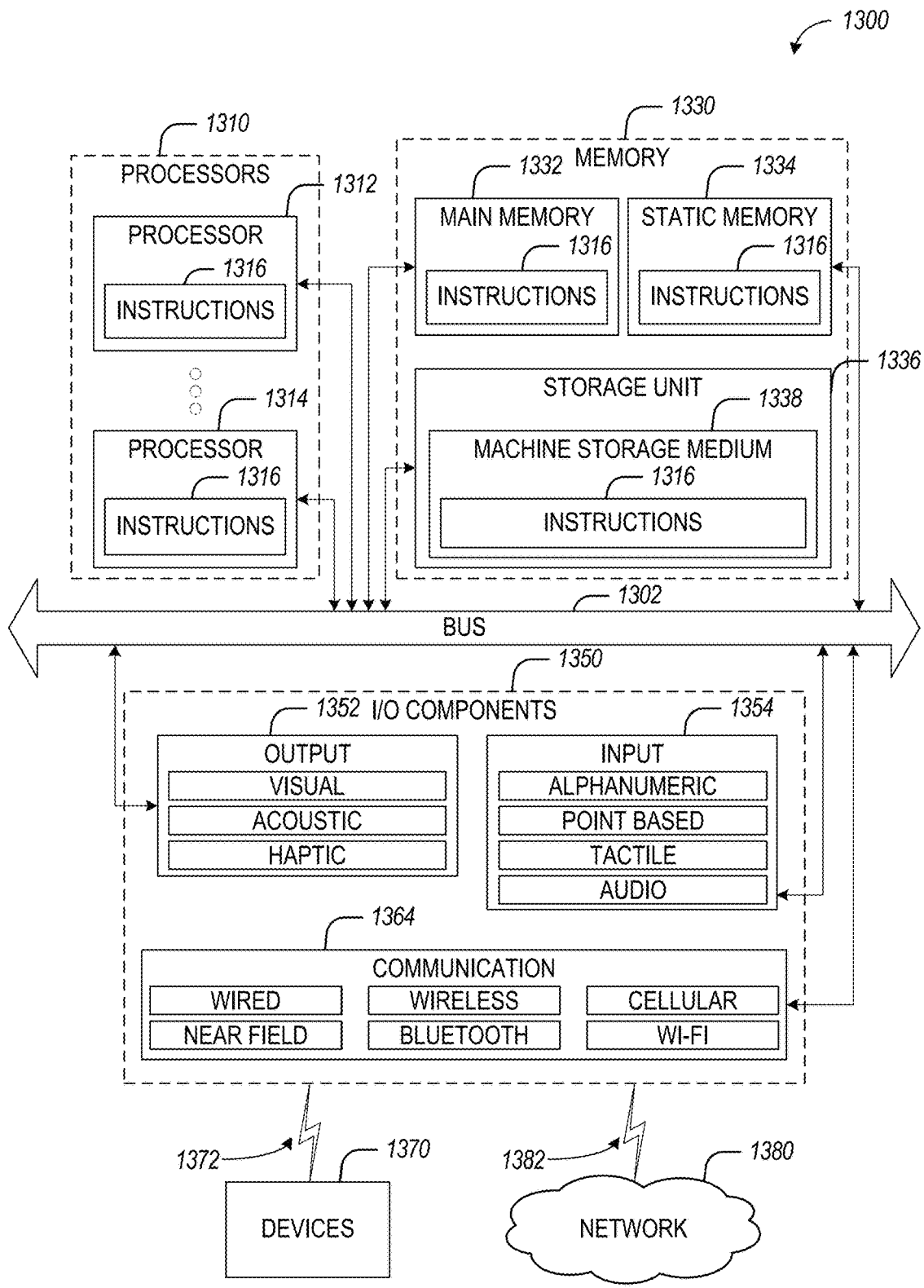
FIG. 13 illustrates a diagrammatic representation of a machine in the form of a computer system within which a set of instructions may be executed for causing the machine to perform any one or more of the methodologies discussed herein, in accordance with some embodiments of the present disclosure.

FIG. 13 illustrates a diagrammatic representation of machine 1300 in the form of a computer system within which a set of instructions may be executed to cause machine 1300 to perform any one or more of the methodologies discussed herein, according to an example embodiment. Specifically, FIG. 13 shows a diagrammatic representation of machine 1300 in the example form of a computer system, within which instructions 1316 (e.g., software, a program, an application, an applet, an app, or other executable code) for causing the machine 1300 to perform any one or more of the methodologies discussed herein may be executed. For example, instructions 1316 may cause machine 1300 to execute any one or more operations of method 1200 (or any other technique discussed herein, for example in connection with FIG. 4-FIG. 12). As another example, instructions 1316 may cause machine 1300 to implement one or more portions of the functionalities discussed herein. In this way, instructions 1316 may transform a general, non-programmed machine into a particular machine 1300 (e.g., the compute service manager 108 or a node in the execution platform 110) that is specially configured to carry out any one of the described and illustrated functions in the manner described herein. In yet another embodiment, instructions 1316 may configure the compute service manager 108 and/or a node in the execution platform 110 to carry out any one of the described and illustrated functions in the manner described herein.

In alternative embodiments, the machine 1300 operates as a standalone device or may be coupled (e.g., networked) to other machines. In a networked deployment, machine 1300 may operate in the capacity of a server machine or a client machine in a server-client network environment or as a peer machine in a peer-to-peer (or distributed) network environment. The machine 1300 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

Machine 1300 includes processors 1310, memory 1330, and input/output (I/O) components 1350 configured to communicate with each other, such as via bus 1302. In some example embodiments, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310, such as via the bus 1302. The main memory 1332, the static memory 1334, and the storage unit 1336 store the instructions 1316, which embody any one or more of the methodologies or functions described herein. The instructions 1316 may also reside, wholly or partially, within the main memory 1332, within the static memory 1334, within machine storage medium 1338 of the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It would be appreciated that the I/O components 1350 may include many other components that are not shown in FIG. 13. The I/O components 1350 are grouped according to functionality merely to simplify the following discussion, and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1350 may include communication components 1364, operable to couple the machine 1300 to a network 1380 or devices 1370 via a coupling 1382 and a coupling 1372, respectively. For example, the communication components 1364 may include a network interface component or another suitable device to interface with network 1380. In further examples, communication components 1364 may include wired communication components, wireless communication components, cellular communication components, and other communication components to provide communication via other modalities. The device 1370 may be another machine or any of a wide variety of peripheral devices (e.g., a peripheral device coupled via a universal serial bus (USB)). For example, as noted above, machine 1300 may correspond to any one of the compute service manager 108 or the execution platform 110, and device 1370 may include the client device 114 or any other computing device described herein as being in communication with the network-based database system 102 or the cloud storage platform 104.

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example, semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media,"

and "device-storage media" specifically exclude carrier waves, modulated data signals, and other such media, at least some of which are covered under the term "signal medium" discussed below.

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1380 or a portion of network 1380 may include a wireless or cellular network, and the coupling 1382 may be a Code Division Multiple Access (CDMA) connection, a Global System for Mobile communications (GSM) connection, or another cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over network 1380 using a transmission medium via a network interface device (e.g., a network interface component included in the communication components 1364) and utilizing any one of several well-known transfer protocols (e.g., hypertext transfer protocol (HTTP)). Similarly, instructions 1316 may be transmitted or received using a transmission medium via coupling 1372 (e.g., a peer-to-peer coupling) to device 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments, the processors may be distributed across several locations.

Described implementations of the subject matter can include one or more features, alone or in combination, as illustrated below by way of examples.

Example 1 is a system comprising at least one hardware processor and at least one memory storing instructions that cause the at least one hardware processor to perform operations comprising generating a processing pipeline definition, the processing pipeline definition comprising a plurality of configurations associated with a corresponding plurality of notification fetching jobs; generating a source monitor definition based on the processing pipeline definition; instantiating a source monitor definition instance based on the source monitor definition; and fetching one or more notifications associated with a data source based on executing at least one notification fetching job of the plurality of notification fetching jobs configured in the source monitor definition instance.

In Example 2, the subject matter of Example 1 includes functionalities such as accessing scheduling information associated with the at least one notification fetching job of the plurality of notification fetching jobs.

In Example 3, the subject matter of Example 2 includes functionalities such as generating a source monitor configuration based on the source monitor definition and the scheduling information.

In Example 4, the subject matter of Example 3 includes functionalities such as scheduling execution of periodic monitoring jobs to perform the fetching of the one or more notifications based on the scheduling information.

In Example 5, the subject matter of Examples 3-4 includes functionalities such as updating the source monitor configuration to further include integration information associated with the data source.

In Example 6, the subject matter of Example 5 includes subject matter where the integration information comprises authentication information and the operations comprising accessing the data source during the at least one notification fetching job based on the authentication information.

In Example 7, the subject matter of Examples 1-6 includes functionalities such as generating the source monitor definition to include at least one notification handler configuration; and processing the one or more notifications based on the at least one notification handler configuration.

In Example 8, the subject matter of Example 7 includes wherein the operations for processing the one or more notifications comprise detecting the one or more notifications indicate presence of new data stored at the data source and filtering the notification based on a configuration of the plurality of configurations corresponding to the at least one notification fetching job.

In Example 9, the subject matter of Example 8 includes functionalities such as determining whether to fetch the new data into a work item queue of a processing pipeline based on the filtering.

In Example 10, the subject matter of Examples 8-9 includes functionalities such as determining whether to fetch the new data into a plurality of work item queues associated with a corresponding plurality of processing pipelines based on the filtering.

Example 11 is a method comprising: generating, by at least one hardware processor, a processing pipeline definition, the processing pipeline definition comprising a plurality of configurations associated with a corresponding plurality of notification fetching jobs; generating a source monitor definition based on the processing pipeline definition; instantiating a source monitor definition instance based on the source monitor definition; and fetching one or more notifications associated with a data source based on executing at least one notification fetching job of the plurality of notification fetching jobs configured in the source monitor definition instance.

In Example 12, the subject matter of Example 11 includes accessing scheduling information associated with the at least one notification fetching job of the plurality of notification fetching jobs.

In Example 13, the subject matter of Example 12 includes generating a source monitor configuration based on the source monitor definition and the scheduling information.

In Example 14, the subject matter of Example 13 includes scheduling execution of periodic monitoring jobs to perform the fetching of the one or more notifications based on the scheduling information.

In Example 15, the subject matter of Examples 13-14 includes updating the source monitor configuration to further include integration information associated with the data source.

In Example 16, the subject matter of Example 15 includes subject matter where the integration information comprises authentication information, and the method comprises accessing the data source during the at least one notification fetching job based on the authentication information.

In Example 17, the subject matter of Examples 11-16 includes generating the source monitor definition to include at least one notification handler configuration and processing the one or more notifications based on the at least one notification handler configuration.

In Example 18, the subject matter of Example 17 includes subject matter where the processing of the one or more notifications comprises detecting the one or more notifications indicate presence of new data stored at the data source; and filtering the notification based on a configuration of the plurality of configurations corresponding to the at least one notification fetching job.

In Example 19, the subject matter of Example 18 includes determining whether to fetch the new data into a work item queue of a processing pipeline based on the filtering.

In Example 20, the subject matter of Examples 18-19 includes determining whether to fetch the new data into a plurality of work item queues associated with a corresponding plurality of processing pipelines based on the filtering.

Example 21 is a computer-storage medium comprising instructions that, when executed by one or more processors of a machine, configure the machine to perform operations comprising generating a processing pipeline definition, the processing pipeline definition comprising a plurality of configurations associated with a corresponding plurality of notification fetching jobs; generating a source monitor definition based on the processing pipeline definition; instantiating a source monitor definition instance based on the source monitor definition; and fetching one or more notifications associated with a data source based on executing at least one notification fetching job of the plurality of notification fetching jobs configured in the source monitor definition instance.

In Example 22, the subject matter of Example 21 includes functionalities such as accessing scheduling information associated with the at least one notification fetching job of the plurality of notification fetching jobs.

In Example 23, the subject matter of Example 22 includes functionalities such as generating a source monitor configuration based on the source monitor definition and the scheduling information.

In Example 24, the subject matter of Example 23 includes functionalities such as scheduling execution of periodic monitoring jobs to perform the fetching of the one or more notifications based on the scheduling information.

In Example 25, the subject matter of Examples 23-24 includes functionalities such as updating the source monitor configuration to further include integration information associated with the data source.

In Example 26, the subject matter of Example 25 includes subject matter where the integration information comprises authentication information and the operations comprising accessing the data source during the at least one notification fetching job based on the authentication information.

In Example 27, the subject matter of Examples 21-26 includes functionalities such as generating the source monitor definition to include at least one notification handler configuration; and processing the one or more notifications based on the at least one notification handler configuration.

In Example 28, the subject matter of Example 27 includes subject matter where the operations for processing the one or more notifications comprise detecting the one or more notifications indicate presence of new data stored at the data source and filtering the notification based on a configuration of the plurality of configurations corresponding to the at least one notification fetching job.

In Example 29, the subject matter of Example 28 includes functionalities such as determining whether to fetch the new data into a work item queue of a processing pipeline based on the filtering.

In Example 30, the subject matter of Examples 28-29 includes functionalities such as determining whether to fetch the new data into a plurality of work item queues associated with a corresponding plurality of processing pipelines based on the filtering.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments and other embodiments not explicitly described herein will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   generating a processing pipeline definition, the processing pipeline definition comprising a plurality of configurations associated with a corresponding plurality of notification fetching jobs;
   generating a source monitor definition based on the processing pipeline definition and a notification handling configuration associated with processing results of the plurality of notification fetching jobs;
   instantiating a source monitor definition instance based on the source monitor definition; and
   fetching one or more notifications associated with a data source based on executing at least one notification fetching job of the plurality of notification fetching jobs configured in the source monitor definition instance.

2. The system of claim 1, the operations comprising:
   accessing scheduling information associated with the at least one notification fetching job of the plurality of notification fetching jobs.

3. The system of claim 2, the operations comprising:
   generating a source monitor configuration based on the source monitor definition and the scheduling information.

4. The system of claim 3, the operations comprising:
   scheduling execution of periodic monitoring jobs to perform the fetching of the one or more notifications based on the scheduling information.

5. The system of claim 3, the operations comprising:
   updating the source monitor configuration to further include integration information associated with the data source.

6. The system of claim 5, wherein the integration information comprises authentication information, and the operations comprising:
   accessing the data source during the at least one notification fetching job based on the authentication information.

7. The system of claim 1, the operations comprising:
   generating the source monitor definition to include at least one notification handler configuration; and
   processing the one or more notifications based on the at least one notification handler configuration.

8. The system of claim 7, wherein the operations for processing the one or more notifications comprise:
   detecting the one or more notifications indicate presence of new data stored at the data source; and
   filtering the notification based on a configuration of the plurality of configurations corresponding to the at least one notification fetching job.

9. The system of claim 8, the operations comprising:
   determining whether to fetch the new data into a work item queue of a processing pipeline based on the filtering.

10. The system of claim 8, the operations comprising:
    determining whether to fetch the new data into a plurality of work item queues associated with a corresponding plurality of processing pipelines based on the filtering.

11. A method comprising:
    generating, by at least one hardware processor, a processing pipeline definition, the processing pipeline definition comprising a plurality of configurations associated with a corresponding plurality of notification fetching jobs;
    generating a source monitor definition based on the processing pipeline definition and a notification handling configuration associated with processing results of the plurality of notification fetching jobs;
    instantiating a source monitor definition instance based on the source monitor definition; and
    fetching one or more notifications associated with a data source based on executing at least one notification fetching job of the plurality of notification fetching jobs configured in the source monitor definition instance.

12. The method of claim 11, further comprising:
    accessing scheduling information associated with the at least one notification fetching job of the plurality of notification fetching jobs.

13. The method of claim 12, further comprising:
    generating a source monitor configuration based on the source monitor definition and the scheduling information.

14. The method of claim 13, further comprising:
    scheduling execution of periodic monitoring jobs to perform the fetching of the one or more notifications based on the scheduling information.

15. The method of claim 13, further comprising:
    updating the source monitor configuration to further include integration information associated with the data source.

16. The method of claim 15, wherein the integration information comprises authentication information, and the method comprises:
accessing the data source during the at least one notification fetching job based on the authentication information.

17. The method of claim 11, further comprising:
generating the source monitor definition to include at least one notification handler configuration; and
processing the one or more notifications based on the at least one notification handler configuration.

18. The method of claim 17, wherein the processing of the one or more notifications comprises:
detecting the one or more notifications indicate presence of new data stored at the data source; and
filtering the notification based on a configuration of the plurality of configurations corresponding to the at least one notification fetching job.

19. The method of claim 18, further comprising:
determining whether to fetch the new data into a work item queue of a processing pipeline based on the filtering.

20. The method of claim 18, further comprising:
determining whether to fetch the new data into a plurality of work item queues associated with a corresponding plurality of processing pipelines based on the filtering.

21. A computer-storage medium comprising instructions that, when executed by one or more processors of a machine, configure the machine to perform operations comprising:
generating a processing pipeline definition, the processing pipeline definition comprising a plurality of configurations associated with a corresponding plurality of notification fetching jobs;
generating a source monitor definition based on the processing pipeline definition and a notification handling configuration associated with processing results of the plurality of notification fetching jobs;
instantiating a source monitor definition instance based on the source monitor definition; and
fetching one or more notifications associated with a data source based on executing at least one notification fetching job of the plurality of notification fetching jobs configured in the source monitor definition instance.

22. The computer-storage medium of claim 21, the operations comprising:
accessing scheduling information associated with the at least one notification fetching job of the plurality of notification fetching jobs.

23. The computer-storage medium of claim 22, the operations comprising:
generating a source monitor configuration based on the source monitor definition and the scheduling information.

24. The computer-storage medium of claim 23, the operations comprising:
scheduling execution of periodic monitoring jobs to perform the fetching of the one or more notifications based on the scheduling information.

25. The computer-storage medium of claim 23, the operations comprising:
updating the source monitor configuration to further include integration information associated with the data source.

26. The computer-storage medium of claim 25, wherein the integration information comprises authentication information, and the operations comprising:
accessing the data source during the at least one notification fetching job based on the authentication information.

27. The computer-storage medium of claim 21, the operations comprising:
generating the source monitor definition to include at least one notification handler configuration; and
processing the one or more notifications based on the at least one notification handler configuration.

28. The computer-storage medium of claim 27, wherein the operations for processing the one or more notifications comprise:
detecting the one or more notifications indicate presence of new data stored at the data source; and
filtering the notification based on a configuration of the plurality of configurations corresponding to the at least one notification fetching job.

29. The computer-storage medium of claim 28, the operations comprising:
determining whether to fetch the new data into a work item queue of a processing pipeline based on the filtering.

30. The computer-storage medium of claim 28, the operations comprising:
determining whether to fetch the new data into a plurality of work item queues associated with a corresponding plurality of processing pipelines based on the filtering.

* * * * *